UNITED STATES PATENT OFFICE.

ELIZABETH ANGELINE SHEWELL, OF BOSTON, MASSACHUSETTS.

IMPROVEMENT IN MEDICAL COMPOUNDS FOR THE CURE OF CUTANEOUS DISEASES.

Specification forming part of Letters Patent No. 121,205, dated November 21, 1871.

*To all whom it may concern:*

Be it known that I, ELIZABETH ANGELINE SHEWELL, of Boston, of the county of Suffolk and State of Massachusetts, have invented or discovered a new and useful Medicinal Composition for the Cure or Alleviation of Scrofula or Cutaneous Diseases; and do hereby declare the same and the ingredients thereof, and the method of compounding them, to be fully described in the following specification.

The ingredients of such composition and the proportions in which they may be employed in its formation are as follows: Honduras sarsaparilla, twelve pounds; dock or dock-root, twelve pounds; taraxicum or dandelion, eight pounds; black alder or tag alder, eight pounds; gum-guiacum, eight pounds; sassafras bark, eight pounds; mandragora, six pounds; burdock-root, eight pounds.

To prepare the composition, the above-mentioned materials, in or about in the proportions as stated, are to be immersed in equal parts of water or brandy, whisky, or an alcoholic spirit of like nature, the amount of the mixture of spirits and water being sufficient to well cover the mass—three gallons of water and three gallons of the spirit sufficing for the purpose with the ingredients in the proportions as stated. Next the whole should be boiled slowly for two hours, after which the decoction should be strained, and to each gallon of it there should be added four pounds of sugar reduced to a thick sirup and clarified. Next the liquor should be boiled until about half of it has been evaporated. After cooling, it will be fit for use or being bottled for use.

For an adult the dose will be about one teaspoonful, to be taken three times in twenty-four hours.

The undersigned, by careful tests and much experience in the use of the said compound of late, has found it to be very efficacious for the purpose for which it is intended.

In making the composition the proportions as stated of the ingredients may be varied somewhat, although those set forth have been found sufficient to produce good results.

I claim as my invention or discovery—

The said medicinal compound, made of materials and in the manner substantially as hereinbefore explained.

ELIZABETH ANGELINE SHEWELL.

Witnesses:
    R. H. EDDY,
    GEORGE G. FOX.

(98)